United States Patent [19]

Masumoto et al.

[11] Patent Number: 5,331,563
[45] Date of Patent: Jul. 19, 1994

[54] NAVIGATION DEVICE AND DIRECTION DETECTION METHOD THEREFOR

[75] Inventors: Yutaka Masumoto; Satoshi Odagawa, both of Kawagoe, Japan

[73] Assignee: Pioneer Electronic Corporation, Tokyo, Japan

[21] Appl. No.: 984,207

[22] Filed: Nov. 30, 1992

[30] Foreign Application Priority Data

Dec. 10, 1991 [JP] Japan .................................. 3-325731

[51] Int. Cl.$^5$ .............................................. G06F 15/50
[52] U.S. Cl. ................................. 364/449; 364/454; 342/457; 340/988; 340/995
[58] Field of Search ............... 364/449, 450, 453, 454, 364/457; 73/178 R; 33/356, 357; 340/988, 950; 342/450, 451, 457

[56] References Cited

U.S. PATENT DOCUMENTS

| | | | |
|---|---|---|---|
| 5,112,960 | 6/1992 | Ooka | 364/453 |
| 5,115,238 | 5/1992 | Shimizu et al. | 340/995 |
| 5,151,862 | 9/1992 | Nakayama et al. | 364/449 |
| 5,235,514 | 8/1993 | Matsuzaki | 364/454 |
| 5,251,139 | 10/1993 | Takano et al. | 364/449 |

Primary Examiner—Gary Chin
Attorney, Agent, or Firm—Kane, Dalsimer, Sullivan, Kurucz, Levy, Eisele and Richard

[57] ABSTRACT

The navigation device includes vehicle condition discriminating unit for discriminating whether the vehicle is stopped or not, angular velocity detecting unit for detecting change of direction of the vehicle and producing angular velocity data on the basis of the detected change of direction, absolute direction detecting unit for detecting geomagnetism and producing absolute direction data on the basis of the detected geomagnetism, offset processing unit for producing corrected angular velocity data from the angular velocity data and a first reference value, and offset reset unit for renewing the first reference value. The offset reset unit renews the first reference value with the angular velocity data which is obtained when the vehicle is discriminated to be stopped, a change rate of the angular velocity data is within a predetermined second reference value and a change rate of the absolute direction data is within a predetermined third reference value.

8 Claims, 3 Drawing Sheets

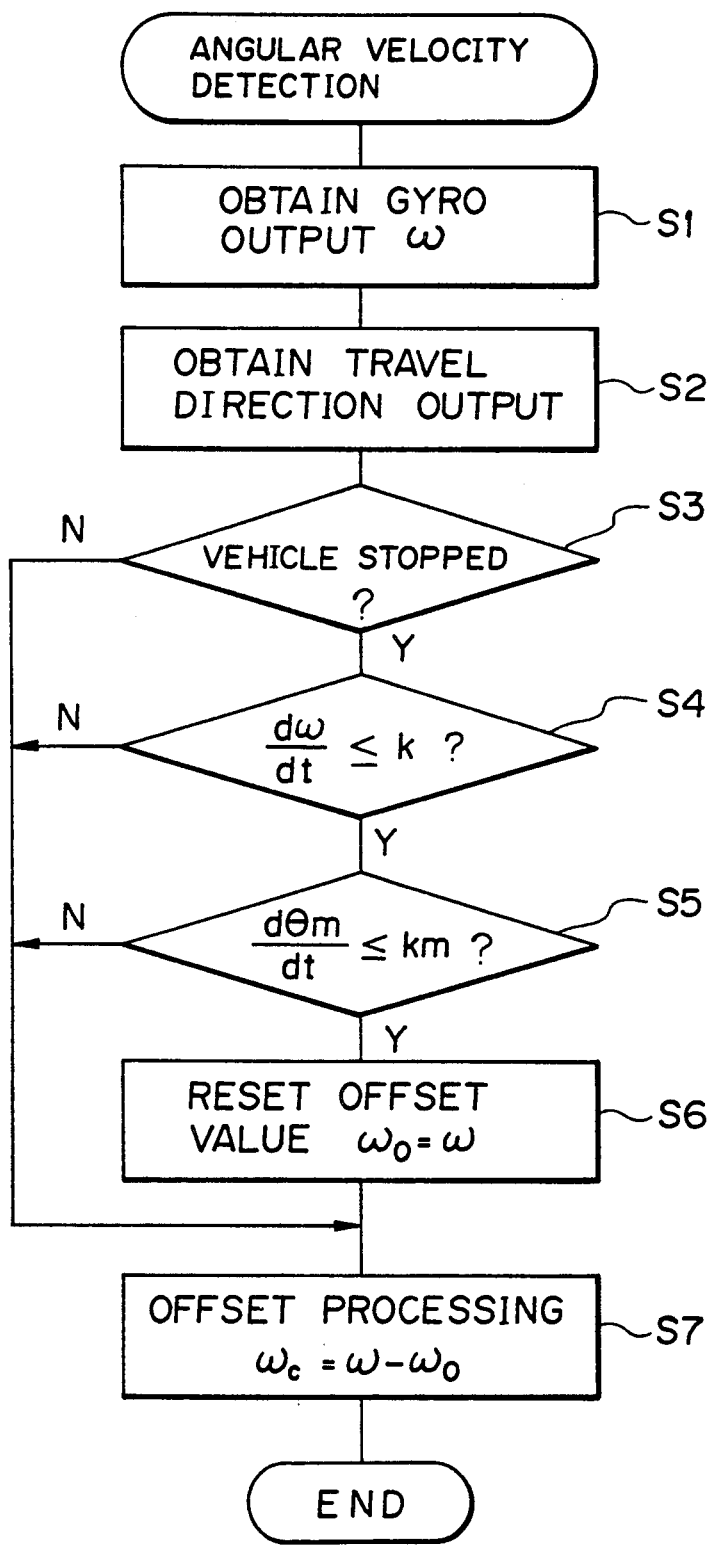

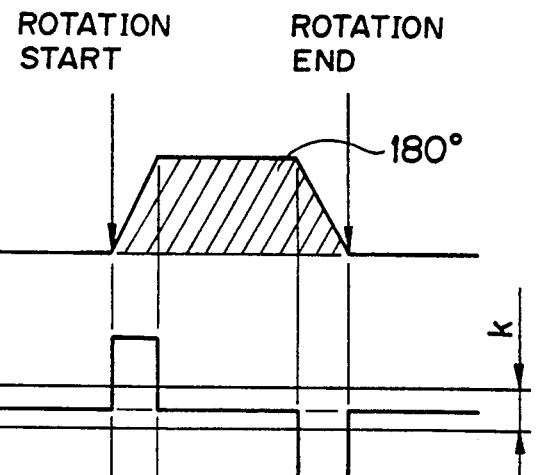
FIG. 3A GYRO OUTPUT ; ω
FIG. 3B CHANGE RATE OF GYRO OUTPUT $\frac{d\omega}{dt}$
FIG. 3C GEOMAGNETIC SENSOR OUTPUT θm
FIG. 3D CHANGE RATE OF GEOMAGNETIC OF OUTPUT θm $\frac{d\theta m}{dt}$

NAVIGATION DEVICE AND DIRECTION DETECTION METHOD THEREFOR

BACKGROUND OF THE INVENTION

1. Field of the Invention

This invention relates to a navigation device which supports driving of a vehicle such as a car or the like by displaying and informing current position and travel direction of the vehicle, and more particularly to an offset processing of the navigation device for correcting an angular velocity data measured by an angular velocity sensor such as a gyro.

2. Description of Prior Art

A navigation device installed in a vehicle such as a car or the like has been required to precisely measure current position and travel direction of the vehicle and then accurately and rapidly display the current position, the travel direction of the vehicle and other information for satisfying user's demands together with a map information corresponding to the current position for assistance of a driver.

One type of navigation devices calculates the current position and travel direction of the vehicle from electric waves transmitted from a GPS (Global Positioning System) satellite (hereinafter referred to as "GPS measurement method"). Another type of navigation device calculates them from data of a direction sensor such as a gyro, a geomagnetic sensor or the like and a travel sensor for measuring a travel distance or the like, each installed in the vehicle (hereinafter referred to as "stand-alone type measurement method"). The GPS measurement method has such various advantages that it is not required to set in advance a vehicle position on a map and that the measurement error of the vehicle position is remarkably small and accordingly high reliability can be achieved. Therefore, the GPS measurement method is broadly used. However, the GPS measurement method can not used when the vehicle travels through a shade of buildings, woods or in a tunnel. On the other hand, the stand-alone type measurement method has such disadvantage that the measured data is not always accurate because of the accumulated error, influences from variations of temperature or condition in the vehicle, and bad influence on the geomagnetic sensor resulting from traveling on iron bridges. Accordingly, the two types of measurement methods are used in combination in order to make up for the above deficiencies with each other.

Since output data of an angular velocity sensor used for the stand-alone type measurement, such as a gyro, varies according to the variation of temperature or humidity, the output data is corrected by using an offset value which is occasionally reset (renewed).

However, the above angular velocity correction method can not accurately detect the change of the direction when the vehicle is rotated by a turntable or the like in a parking zone, for example. This is because, in such a case, since the vehicle is stopped even though the turntable is rotated, the reset (renewal) of the offset value is erroneously executed.

SUMMARY OF THE INVENTION

It is an object of this invention to provide a navigation device which can accurately detect the change of the direction of the vehicle even when the vehicle is stopped.

According to one aspect of the invention, there is provided a navigation device including vehicle condition discriminating unit for discriminating whether the vehicle is stopped or not, angular velocity detecting unit for detecting change of direction of the vehicle and producing angular velocity data on the basis of the detected change of direction, absolute direction detecting unit for detecting geomagnetism and producing absolute direction data on the basis of the detected geomagnetism, offset processing unit for producing corrected angular velocity data from the angular velocity data and a first reference value, and offset reset unit for renewing the first reference value.

The offset reset unit renews the first reference value with the angular velocity data which is obtained when the vehicle is discriminated to be stopped, a change rate of the angular velocity data is within a predetermined second reference value and a change rate of the absolute direction data is within a predetermined third reference value.

According to another aspect of the present invention, there is provided a method of detecting traveling direction data obtained by a navigation device which detects angular velocity indicating the traveling direction of a vehicle, the method comprising the steps of, discriminating whether the vehicle is stopped or not, detecting change of direction of the vehicle and producing angular velocity data on the basis of the detected change of direction, detecting geomagnetism and producing absolute direction data on the basis of the detected geomagnetism, producing corrected angular velocity data from the angular velocity data and a first reference value, and renewing the first reference value with the angular velocity data which is obtained when the vehicle is discriminated to be stopped, a change rate of the angular velocity data is within a predetermined second reference value and a change rate of the absolute direction data is within a predetermined third reference value.

According to the present invention, the change of the direction can be accurately detected, and a navigation device reliable in direction detection function can be provided.

BRIEF DESCRIPTION OF THE DRAWINGS

FIG. 2 is a flowchart showing an operation of angular velocity detection according to the present invention; and FIGS. 3A–3D are diagrams showing output signals of the sensors of the navigation device according to the present invention.

DETAILED DESCRIPTION OF THE INVENTION

Figure 1:
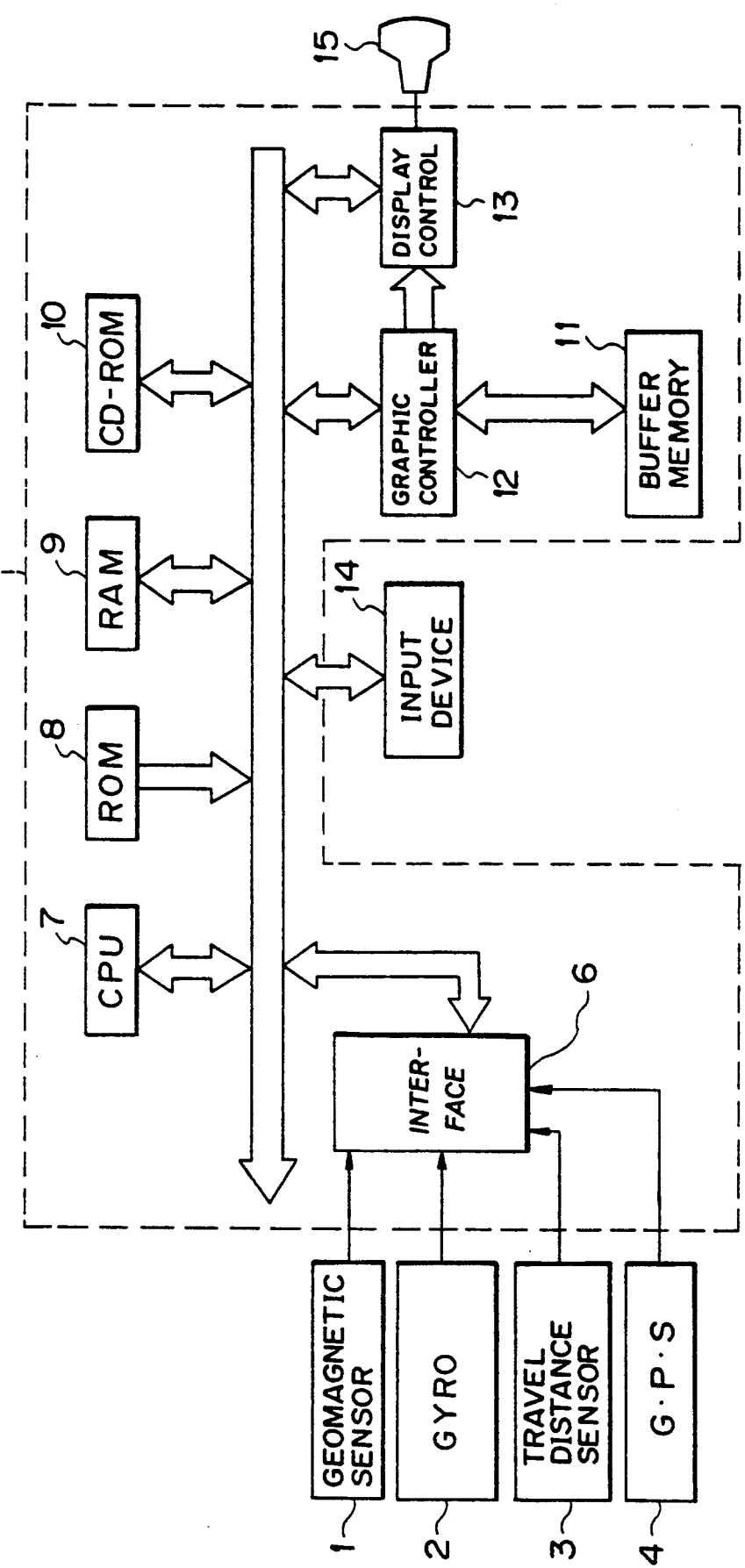
FIG. 1 is a block diagram showing an embodiment of a navigation device according to the present invention.

A preferred embodiment according to the present invention will now be described below with reference to the accompanying drawings.

FIG. 1 is a block diagram showing an embodiment of a navigation device for a vehicle according to the present invention. As shown in FIG. 1, the navigation device includes a geomagnetic sensor 1 for outputting a direction data of the vehicle on the basis of geomagnetism (earth magnetism), a gyro 2 for detecting an angular velocity variation of the vehicle, a travel distance sensor 3 for discriminating whether the vehicle is running or stopped by the speed of the vehicle and measuring a travel distance of the vehicle, a GPS measurement device 4 for receiving electric waves from a plurality of GPS satellites to calculate and output data of latitude, longitude, altitude and travel direction of the vehicle on the basis of the received signals, a system controller 5 for executing various processings such as calculation, control, etc., an input device 14 for inputting various instructions into the system controller 5, and a display 15 such as a liquid crystal display, a CRT or the like.

The system controller 5 includes an interface 6 for receiving the output signals from the geometric sensor 1, the travel distance sensor 3 and the GPS measurement device 4 and subjecting these output signals to A/D conversion, a CPU (Central Processing Unit) 7 for carrying out various calculations and controls in accordance with processing programs, a ROM (Read Only Memory) 8 in which various processing programs and other necessary information are beforehand stored, a RAM (Random Access Memory) 9 in and from which information required to execute the programs are written and read, a recording medium 10 such as a CD-ROM, an IC card or the like in which digitalized map information, etc. are recorded, a buffer memory 11 such as V-RAM (video RAM) or the like for temporarily storing, as a frame buffer, an image information to be directly displayed, a graphic controller 12 for inputting graphic data such as map information into the buffer memory 11 and outputting the data stored in the buffer memory 11 as image information in response to the instruction from the CPU 7, and a display control circuit 13 for receiving the image information output from the graphic controller 12 and controlling an image display operation of the display 15 on the basis of the received image information.

When the navigation device thus constructed is activated, the system controller 5 reads out information for access of the map display information and a display information for the vehicle position mark, etc. from the recording medium 10, and then stores these information into the RAM 9. Subsequently, the system controller 5 reads out latitude/longitude data corresponding to vehicle position information and travel direction information of the vehicle through the GPS positioning device 4, and reads out the map information corresponding to the obtained vehicle position from the recording medium 10. The read-out map information is fed to the graphic controller 12 to be displayed as the current position map on the display 15. In addition, the system controller 5 displays the vehicle position mark on the map on the basis of the vehicle position information and the travel direction information. Subsequently, the vehicle position information and the travel direction information are periodically obtained from the GPS measurement device 4 to renew the display position, direction of the vehicle position mark, and the display map if necessary- Further, the output data from the geomagnetic sensor 1, the angular velocity sensor 2 and the travel distance sensor 3 are periodically read out and then subjected to a predetermined calculation to produce the vehicle position and the travel direction of the vehicle. After comparing the thus calculated information with the information obtained from the GPS measurement device 4, a correction is carried out to reduce the deviation (error) between these information. In the detection of the traveling direction of the vehicle from the output data of the geomagnetic sensor 1, the gyro 2 and the travel distance sensor 3, the system controller 5 calculates the traveling direction of the vehicle based on the changes of the angular velocity data which is obtained in the angular velocity detection process shown in FIG. 2.

FIG. 2 shows the angular velocity detection process performed by the system controller 5 which include the offset reset operation.

In the angular velocity detection process, first, the system controller 5 obtains the output data $\omega$ from the gyro 2 and the travel distance data from the travel distance sensor 3 in steps S1 and S2. Then it is discriminated that whether the vehicle is stopped or not based on the data obtained from the travel distance sensor 3. If the discrimination in step S3 results in YES, the rate of change of the angular velocity $\omega$, i.e., the acceleration $d\omega/dt$ is calculated and it is discriminated that the acceleration $d\omega/dt$ is within (smaller than) a predetermined value k or not in step S4. If the discrimination in step S4 results in YES, the absolute direction data $\theta_m$ is obtained from the geomagnetic sensor 1, the change rate $d\theta_m/dt$ of the absolute direction data $\theta_m$ is calculated from the data previously obtained, and it is discriminated that the change rate $d\theta_m/dt$ of the absolute direction data $\theta_m$ is within a predetermined value $k_m$ in step S5. If the discrimination in step S5 results in YES, the reference output value (offset value) $\omega_0$ of the gyro 2 is reset to be the angular velocity value $\omega(\omega_0=\omega)$ at that time in step S6. If the offset value is thus reset in step S6, the corrected angular velocity value $\omega_c(=\omega-\omega_0)$ obtained by the offset processing in step S7 becomes equal to zero.

If at least one of the discriminations in steps S3 to S5 results in NO, and the offset processing in step S7 is executed without resetting the offset value $\omega_0$ and the corrected angular velocity value $\omega_c$ is calculated using the previous offset value $\omega_0$.

Next, the angular velocity detection is described in more detail with reference to FIGS. 3A to 3D. FIG. 3A shows the change of the angular velocity data $\omega$ output from the gyro 2 when the vehicle is rotated by 180 degrees by turntable or the like. IN FIG. 3A, the square measure of the oblique line area corresponds to the rotation degree of 180 degrees, and the rotation speed of the turn table is substantially constant except at the beginning and the ending of the rotation. FIG. 3B shows the change rate $d\omega/dt$ of the angular velocity data $\omega$. FIG. 3C shows the relative change of the direction obtained from the absolute direction data $\theta_m$ output from the geomagnetic sensor 1 when the vehicle is rotated by 180 degrees in the same manner. FIG. 3D shows the change rate $d\theta_m/dt$ of the absolute direction data $\theta_0$ at that time. When the vehicle is rotated by 180 degrees, the change rate $d\theta_m/dt$ of the absolute direction data $\theta_m$ becomes out of the predetermined value $k_m$ during the rotation, as shown in FIG. 3D.

If only the change rate $d\omega/dt$ of the angular velocity data $\omega$, shown in FIG. 3B, is monitored and the offset value is reset in accordance with the monitor result, the change of the direction can not detected because the change rate $d\omega/dt$ obtained from the gyro 2 only changes at the beginning and the ending of the rotation and the change rate $d\omega/dt$ becomes within the predetermined value k in the intermediate of the rotation. Accordingly, the navigation device according to the present invention monitors not only the change rate $d\omega/dt$ but also the change rate $d\theta_m/dt$ of the absolute direction data $\theta_m$. Therefore, the offset value is not reset and the change of the direction can be detected because the change of rate $d\theta_m/dt$ obtained from the geomagnetic sensor 1 is thus monitored. Further, since the predetermined value $k_m$ determined to be a change rate when the direction of the vehicle is not changed (fixed), the offset reset is executed only when the change rate $d\theta_m/dt$ is within the predetermined value $k_m$, i.e., only when the direction of the vehicle does not changed and the corrected angular velocity obtained by the offset processing is detected when the direction of the vehicle is changed.

As described above, according to the present invention, the change of the direction can be accurately detected, and a navigation device reliable in direction detection can be provided.

What is claimed is:

1. A navigation device comprising:
   vehicle condition discriminating means for discriminating whether a vehicle is stopped or not;
   angular velocity detecting means for detecting change of direction of the vehicle and producing angular velocity data on the basis of the detected change of direction;
   absolute direction detecting means for detecting geomagnetism and producing absolute direction data of the vehicle on the basis of the detected geomagnetism;
   offset processing means for producing corrected angular velocity data from said angular velocity data and a first reference value; and
   offset reset means for renewing said first reference value with said angular velocity data when the vehicle is discriminated to be stopped, a change rate of the angular velocity data is within a predetermined second reference value and a change rate of the absolute direction data is within a predetermined third reference value.

2. A navigation device according to claim 1, wherein said offset processing means produces the corrected angular velocity data by subtracting said first reference value from said angular velocity data.

3. A navigation device according to claim 1, wherein said third reference value is the change rate of the absolute direction data when the direction of the vehicle is fixed.

4. A navigation device according to claim 1, wherein said vehicle condition discriminating means discriminates the vehicle condition on the basis of a speed of the vehicle.

5. A navigation device according to claim 1, wherein said angular velocity detecting means comprises a gyro.

6. A method of detecting traveling direction data obtained by a navigation device which detects angular velocity indicating the traveling direction of a vehicle, said method comprising the steps of;
   discriminating whether the vehicle is stopped or not;
   detecting change of direction of the vehicle and producing angular velocity data on the basis of the detected change of direction;
   detecting geomagnetism and producing absolute direction data of the vehicle on the basis of the detected geomagnetism;
   producing corrected angular velocity data from said angular velocity data and a first reference value; and
   renewing said first reference value with said angular velocity data when the vehicle is discriminated to be stopped, a change rate of the angular velocity data is within a predetermined second reference value and a change rate of the absolute direction data is within a predetermined third reference value.

7. A method according to claim 6, wherein said corrected angular velocity data is produced by subtracting said first reference value from said angular velocity data.

8. A method according to claim 6, wherein said third reference value is the change rate of the absolute direction data when the direction of the vehicle is fixed.

* * * * *